INVENTOR.
IRA KAMEN &
HAROLD R. WALKER
BY Constantine A. Michalos
ATTORNEY

LOW FREQUENCY TELEVISION SYSTEM

Filed June 2, 1966 3 Sheets-Sheet 2

INVENTOR.
IRA KAMEN &
HAROLD R. WALKER
BY Constantine A. Michalos
ATTORNEY

LOW FREQUENCY TELEVISION SYSTEM

Filed June 2, 1966 3 Sheets-Sheet 3

*INVENTOR.*
IRA KAMEN &
HAROLD R. WALKER
BY Constantine A. Michalos
ATTORNEY

United States Patent Office 3,518,376

Patented June 30, 1970

3,518,376

LOW FREQUENCY TELEVISION SYSTEM

Ira Kamen, New York, N.Y., and Harold R. Walker, Metuchen, N.J., assignors to Educasting Systems, Inc., New York, N.Y., a corporation of New York Filed June 2, 1966, Ser. No. 554,827
Int. Cl. H04j *1/00*
U.S. Cl. 179—15 11 Claims

ABSTRACT OF THE DISCLOSURE

A communication system is described wherein a plurality of signals are transmitted over a common low-frequency circuit. In a preferred embodiment, a television camera which is operated under the control of a common selected standard T-V broadcast signal provides a video signal which is sampled at a low frequency rate related to the synchronization signal presented in the standard selected T-V broadcast signal. The sampled video signal is transmitted over a low-frequency circuit to a remote receiving site. At the receiving site, a television receiver operated with the same synchronization signal used with the transmitting camera is operated to display the sampled video signals as received over the low-frequency circuit. The sampling of the T-V signal at the transmitter site near the camera is conducted at a frequency differing slightly from the synchronization signals in the broadcast signal so that upon arrival at the receiving site, a complete video picture can be reproduced.

This invention relates to communication systems and, more particularly, to a communication system using multiplexing techniques to transmit a plurality of audio and video signals.

Multiplexing, the technique of simultaneously transmitting a plurality of signals over the same transmission lines, is rapidly assuming increased commercial importance. Communications signal multiplexing finds wide use in preprogrammed advertising and entertainment sequences, and is particularly adaptable to educational programs employing television techniques. For a multiplexing system to be of maximum utility, the system must be implemented with existing commercially available equipment and, for application in the communications field, the system must be compatible with current Federal Communications Commission signal distribution standards.

One object of this invention is to provide novel means for simultaneously transmitting a plurality of audio and video signals.

Another object of this invention is to provide novel means for simultaneously transmitting a plurality of audio and video signals, with the transmitted signals being distributed in accordance with existing regulatory standards.

Another object of this invention is to provide means for multiplexing a plurality of signals, including novel means for superimposing a plurality of sub-carrier signals on a modulated broadcast signal.

Another object of this invention is to provide a multiplexing system using existing commercially available equipment.

Another object of this invention is to provide novel means for providing a plurality of audio and video signals; means for simultaneously transmitting the provided signals; and means for receiving and detecting the transmitted signals so as to render the signals sequentially accessible in accordance with a predetermined program.

This invention contemplates a communications system comprising, means for providing a plurality of audio and video signals of discrete frequencies in accordance with an allowable signal distribution program; means for modulating said signals and for providing a plurality of subcarrier signals; means for providing an unmodulated pilot signal; means for simultaneously transmitting the plurality of sub-carrier signals and the unmodulated pilot signal; and means for receiving and detecting the transmitted signals so as to provide audio and video representations thereof.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

For purposes of illustration, the system constructed in accordance with the present invention will be described with reference to the simultaneous transmission of four audio signals and a single video signal, although it will be obvious to those skilled in the art that any number and any combination of audio and video signals may be transmitted by like means.

Audio signal multiplexing is accomplished in accordance with the first embodiment of the invention wherein four single sideband audio modulated sub-carrier signals are superimposed on a frequency modulated broadcast signal. Video signal multiplexing is accomplished in accordance with the second embodiment of the invention wherein a single sideband video modulated sub-carrier signal is superimposed on a phase modulated broadcast signal. It will be further obvious to those skilled in the art that other sub-carrier signal modes including audio modulation, frequency modulation, phase modulation or single sideband audio modulation may be used as well.

Figure 1:
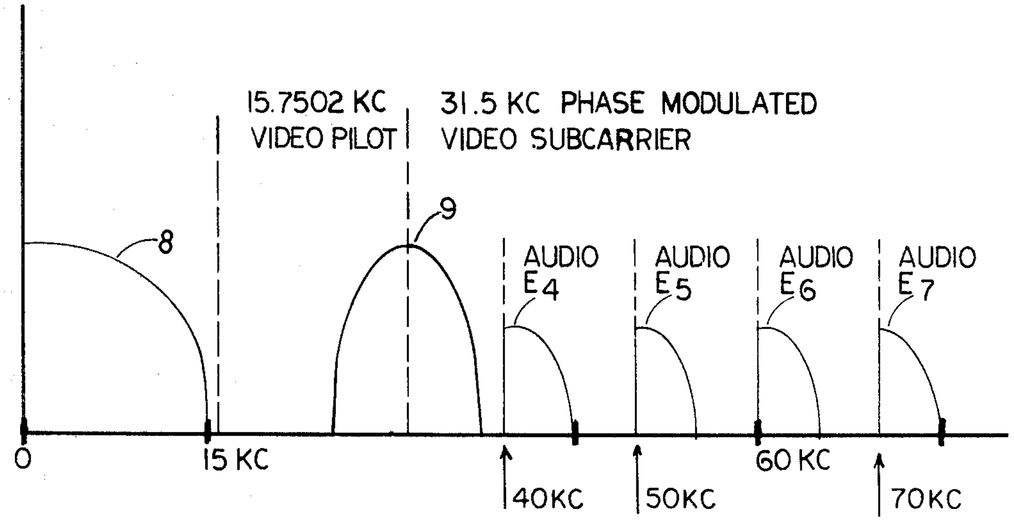
FIG. 1 is a diagrammatic representation of an illustrative group of signals distributed in accordance with Federal Communications Commission standards.

In reference to FIG. 1, the audio and video sub-carrier signals used for purposes of illustration in the first and second embodiments of the present invention are shown distributed in accordance with Federal Communications Commission standards. The audio signal multiplexing system of the first embodiment utilizes a 60 kilocycle pilot signal and four single sideband audio modulated signals of 40 kilocycles, 50 kilocycles, 60 kilocycles and 70 kilocycles, with the signals being designated in FIG. 1 by letters $E_4$, $E_5$, $E_6$, and $E_7$, respectively. A 15.7502 kilocycle video pilot signal is designated by the numeral 8, and a 31.5 kilocycle video modulated sub-carrier signal is designated by the numeral 9.

Figure 2:
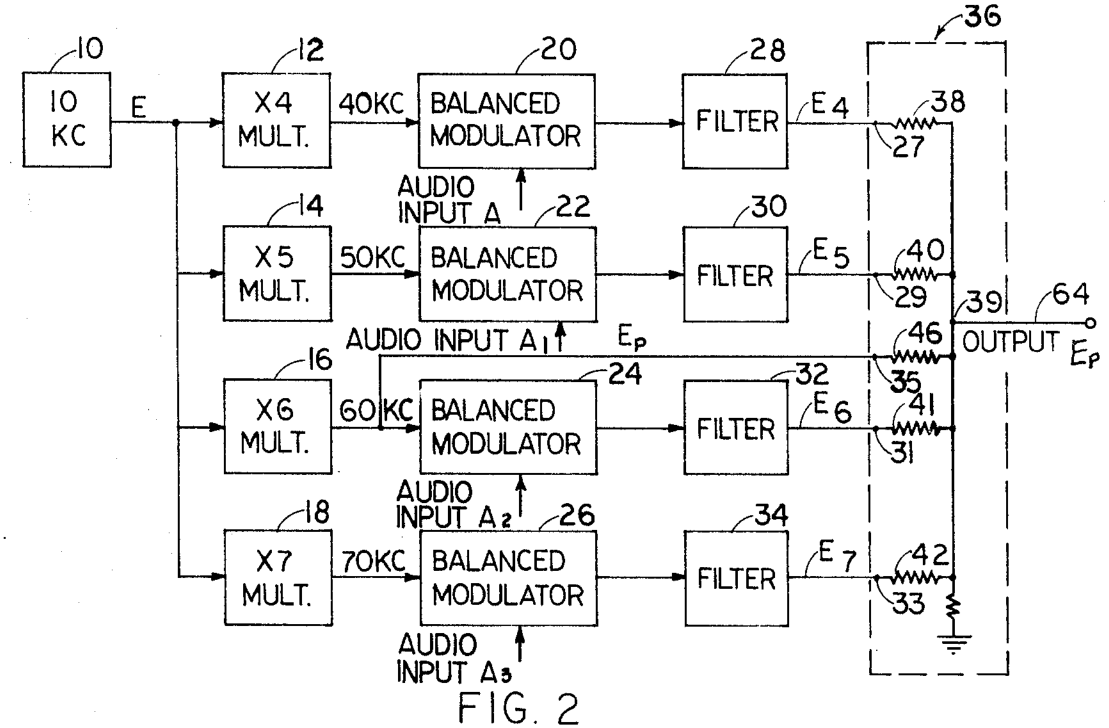
FIG. 2 is a block diagram showing means for providing a plurality of audio sub-carrier signals in accordance with a first embodiment of the present invention.

In reference to FIG. 2, an oscillator 10 provides a 10 kilocycle signal E. Signal E is applied to multipliers 12, 14, 16 and 18 providing signals at the outputs thereof of 40, 50, 60 and 70 kilocycles, respectively. The latter signals are applied to the balanced modulators 20, 22, 24 and 26, respectively. The modulators being of a type well known in the art for modulating the 40, 50, 60 and 70 kilocycle signals with audio input signals A, $A_1$, $A_2$, and $A_3$ to provide suppressed carrier signals corresponding to the 40, 50, 60 and 70 kilocycle signals from multipliers 12, 14, 16 and 18. Filters 28, 30, 32 and 34 are connected to modulators 20, 22, 24 and 26, respectively, for filtering the suppressed carrier signals, thereby removing the lower sidebands from the signals to provide single sideband sub-carrier signals $E_4$, $E_5$, $E_6$ and $E_7$. Signals $E_4$, $E_5$, $E_6$ and $E_7$ are applied to the input terminals 27, 29, 31 and 33 of a mixer 36 and coupled to an output terminal 39 of mixer 36 through resistors 38, 40, 41 and 42 respectively. The 60 kilocycle signal from multiplier 16 is applied to another input terminal 35 of mixer 36 and coupled to output terminal 39 through a resistor 46 to provide a 60 kilocycle audio pilot signal $E_p$.

Figure 3:
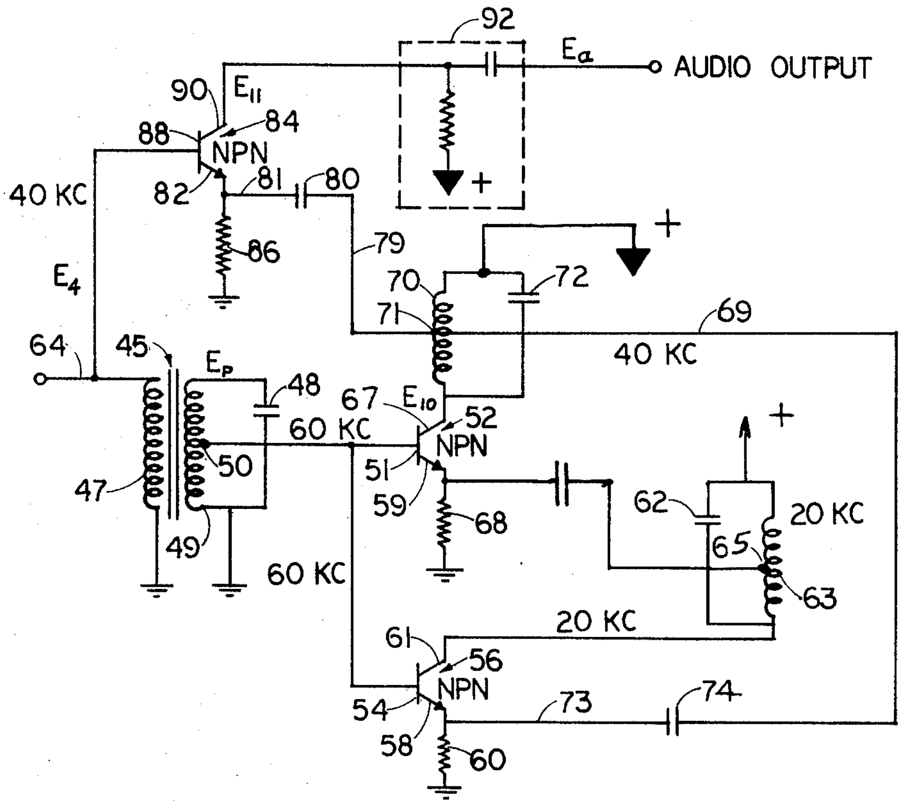
FIG. 3 is an electrical schematic diagram showing means for receiving signals provided in accordance with the block diagram of FIG. 2.

Audio pilot signal $E_p$ is applied through conductor 64 to a receiver including a regenerative modulator which is best shown in FIG. 3 and includes a transformer 45 having a primary coil 47 and a secondary coil 49. A capacitor 48 is connected across secondary coil 49 of transformer 45, with secondary coil 49 having a tap 50 connected to a base 51 of an NPN type transistor 52. The tap 50 of secondary coil 49 is also connected to a base 54 of an NPN type transistor 56, with an emitter 58 of transistor 56 grounded through a resistor 60, and a collector 61 of transistor 56 coupled to an emitter 59 of transistor 52 through a capacitor 62 connected across a coil 63. Coil 63 has a tap 65 connected to emitter 59 of transistor 52 with emitter 59 grounded through a resistor 68. Transistor 52 mixes 60 kilocycle pilot signal $E_p$ with a 20 kilocycle output from coil 63 to provide a signal $E_{10}$ having a 40 kilocycle beat at a collector 67 of transistor 52. Signal $E_{10}$ is coupled, through a capacitor 72 connected across a coil 70, to emitter 58 of transistor 56, with coil 70 having a tap 71 connected to emitter 58 through a conductor 69, a capacitor 74, and a conductor 73. Transistor 56 mixes 60 kilocycle signal $E_p$ with the 40 kilocycle signal from coil 70 to provide the 20 kilocycle signal at collector 61 of transistor 56.

Coil 70 is coupled through a conductor 79, a capacitor 80 and a conductor 81 to an emitter 82 of an NPN type transistor 84, with emitter 82 gorunded through a resistor 86. A single sideband sub-carrier signal, such as that provided as described with reference to FIG. 2, and shown herein for purposes of illustration as signal $E_4$, is applied to a base 88 of transistor 84, causing 40 kilocycle signal $E_4$ and 40 kilocycle signal $E_{10}$ to beat together providing a signal $E_{11}$ at collector 90 of transistor 84. Signal $E_{11}$ is coupled through a filter 92 providing an audio output signal $E_a$. It will now be obvious to those skilled in the art that by changing the values of coils 49, 63 and 70 signals $E_5$, $E_6$ and $E_7$, provided as shown in FIG. 2, may be similarly detected and received.

A synchronizing signal is provided by a transmitter at a pre-selected television station. A 15.750 kilocycle horizontal sweep signal is filtered from the receiver at a station which transmits encoded video signals and a sinusoidal signal which is provided therefrom is passed through a phase shifter such as that shown in FIG. 4.

Figure 4:
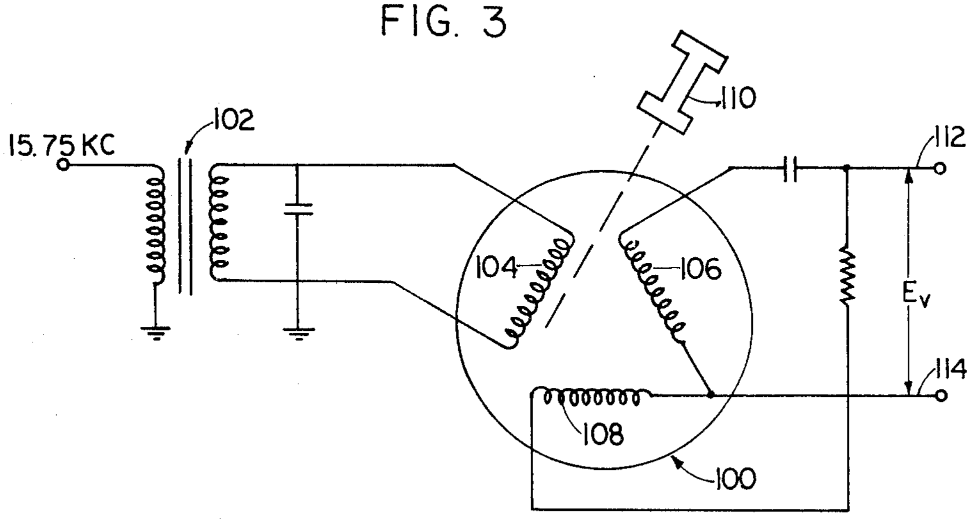
FIG. 4 is an electrical schematic diagram showing means for shifting the phase of signals provided in accordance with a second form of the invention.

The phase shifter of FIG. 4 includes a two-phase resolver 100 and a transformer 102. The 15.750 kilocycle signal is coupled to an input winding 104 of resolver 100 through the transformer 102 with the output winding of resolver 100 having two coils 106 and 108 mounted on a shaft 110. Shaft 110 of resolver 100 is driven, for example, at an angular speed of 12 revolutions per minute or 360 degrees in five seconds. The frequency of the signal at the input of resolver 100 is increased by the angular speed of shaft 110 providing a video scanning pilot signal $E_v$ at the output conductors 112 and 114 of resolver 100 having a frequency of 15.7502 kilocycles per second.

Figures 5, 6:
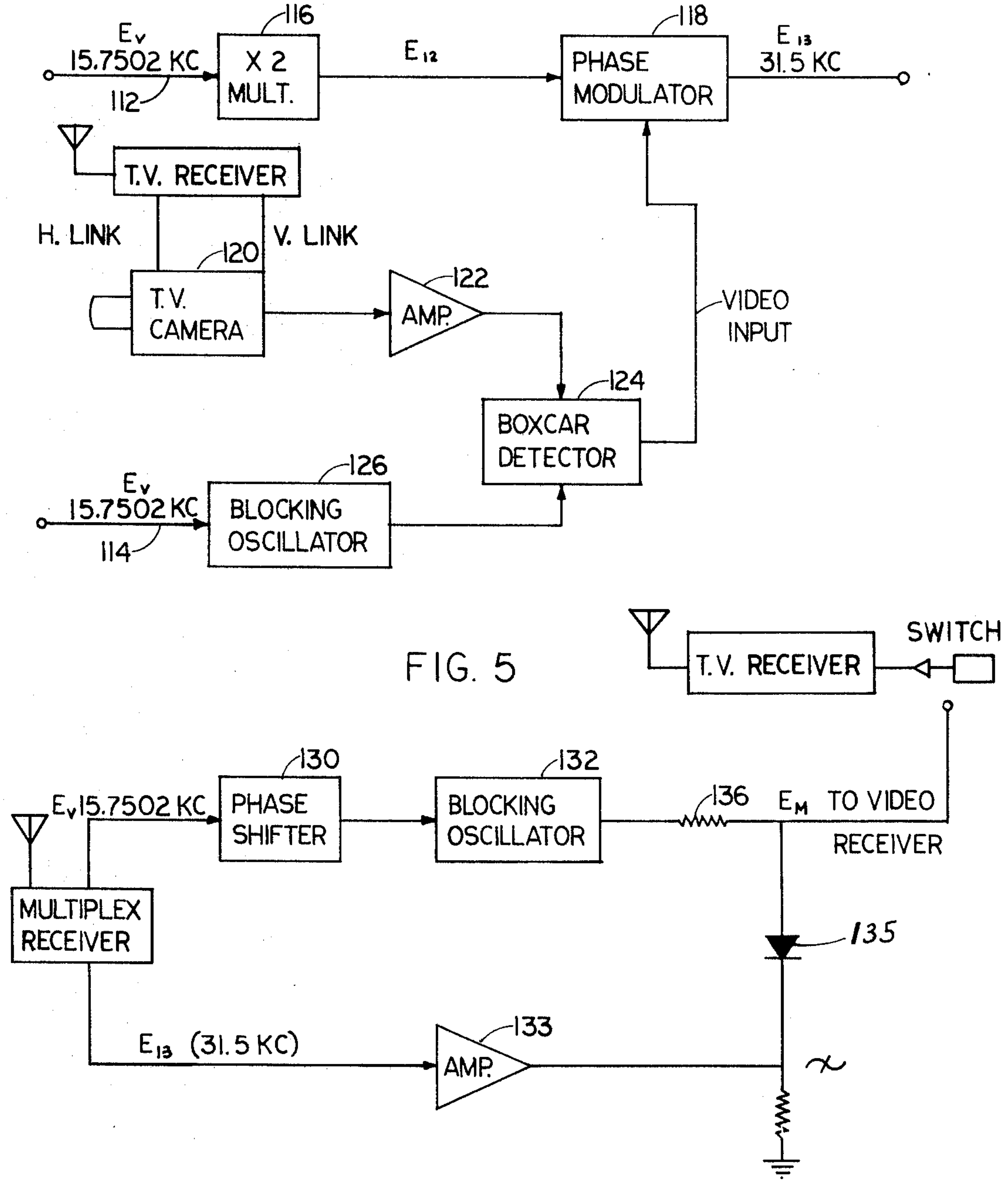
FIG. 5 is a block diagram showing means for converting the phase shifted signals provided in accordance with the electrical schematic diagram of FIG. 4 into video sub-carrier signals.
FIG. 6 is a block diagram showing means for receiving the video sub-carrier signals provided in accordance with the block diagram of FIG. 5.

Pilot signal $E_v$ is applied to a multiplier 116 as shown in the block diagram of FIG. 5, providing a 31.5 kilocycle signal $E_{12}$ which is phase modulated with video data by a phase modulator 118 as shown in the block diagram of FIG. 5 to provide a phase modulated video sub-carrier signal $E_{13}$.

The video data is provided by a television camera 120 which is synchronized with the scanning frequency of the transmitter at the pre-selected television station. The video signal from camera 120 is applied to a low impedance amplifier 122, and the output of amplifier 122 is applied to a boxcar detector 124 which is of a type well known in the art.

Scanning pilot signal $E_v$ is applied to a blocking oscillator 126 for automatically synchronizing blocking oscillator 126 with a receiver tuned to the pre-selected television station. Blocking oscillator 126 provides a one-quarter micro-second pulse which is applied to boxcar detector 124 to render detector 124 effective for sampling the video signal from amplifier 122. The sampled video signal at the output of detector 124 is applied to phase modulator 118 for providing signal $E_{13}$.

Scanning pilot signal $E_v$ and video signal $E_{13}$ are simultaneously transmitted with audio signals $E_4$, $E_5$, $E_6$ and $E_7$ and audio pilot signal $E_p$ with video signals $E_v$ and $E_{13}$ being received and detected as will next be explained.

The transmitted video signals are detected by using standard television receiving apparatus, modified so as to provide a picture tube having long persistence characteristics, and adapted for coupling video signals $E_v$ and $E_{13}$.

The receiver is tuned to the operating frequency of the pre-selected television station which is chosen for common synchronizing purposes and picture tube deflection is synchronized with this station. Pilot signal $E_v$ of 15.7502 kilocycles is applied to a phase shifter 130, which is used for picture centering, shown in FIG. 6, with the phase shifter signal applied to trigger a blocking oscillator 132 which provides pulses of one-quarter microsecond duration. The pulses provided by oscillator 132 are coupled through a modulating resistor 136 providing pulses $E_m$ which are applied to the video receiver for producing an image. The amplitude of these pulses is limited by a diode 135 which clamps the pulse to the level of phase modulated signal $E_{13}$.

It is to be noted that pilot signal $E_v$ is continuously shifting phase with respect to the preselected station chosen for synchronizing purposes and oscillator 132 will provide pulses at a rate corresponding to the frequency of signal $E_v$ (15.7502 kilocycles per second) so that the slow scan image consisting of a vertical line of dots appears to sweep across the face of the television receiver once every five seconds. The high persistence tube retains the image written in by the amplitude of the dots.

Phase modulated video signal $E_{13}$ at the output of phase modulator 118 shown in FIG. 4 varies in phase and is applied to a low output impedance amplifier 133 with the output from amplifier 133 being sampled by oscillator 132 and diode 135 providing amplitude modulated pulses to provide video signal $E_m$ which is displayed by the tube.

SUMMARY

In the invention, a base audio signal is provided and a plurality of signals of varying frequencies are created therefrom. The plurality of created signals are modulated to provide suppressed carrier signals and filtered for removal of the lower sidebands, to provide a plurality of single sideband sub-carrier signals. An unmodulated pilot signal of a predetermined frequency, and the plurality of sub-carrier signals are simultaneously transmitted to a receiver including a regenerative modulator for providing an audio signal at the receiving station.

A scanning pilot signal having a predetermined frequency is provided from a pre-selected television station. The pilot signal is phase shifted and multiplied, with the multiplied signal being modulated with video data. The pilot signal and the multiplied signal are transmitted to the receiving station and detected with the audio detecting apparatus as heretofore noted. The pilot signal is used to trigger an oscillator for providing a pulse which occurs at the frequency of the pilot signal to provide a video image consisting of a vertical row of dots sweeping across the receiving station.

The system constructed in accordance with the present invention provides audio versatility in that each of the sub-carrier signals $E_4$, $E_5$, $E_6$, and $E_7$ may carry different audio presentations, with each presentation adaptable for being selectively provided in a sequential manner to a plurality of subscribers. The simultaneous transmission of video signals provides a synchronized audio-video presentation particularly adaptable to programmed advertising, entertainment and educational programs.

While two embodiments of the invention have been illustrated and described, various changes in the form and relative arrangements of the parts, which will now appear to those skilled in the art may be made without departing from the scope of the invention.

We claim:

1. A communication system wherein a plurality of signals are transmitter over a common low frequency circuit comprising a common sub-harmonic frequency source, means providing carrier signals related arithmetically wherein each of said carrier signals is generated from a different integral multiple of said sub-harmonic frequency source, means for modulating the carrier signals with audio frequency signals and suppress selected ones of said carriers with sidebands only remaining, means for removing like sidebands of said selected modulated uppressed sound carriers to provide single sideband audio signals, means for combining said single sideband signals and a selected proportion of an unmodulated carrier signal into a multiplexed sound signal, receiving means for said multiplexed sound signal, said receiving means including means for separating the unmodulated carrier signal from the single sideband signals, regenerative converting means responsive to the separated unmodulated carrier signal for converting said unmodulated carrier signal to one of said arithmetically related carrier signals, and means responsive to the converted carrier signal and said multiplexed single sideband signals for detecting an associated single sideband signal.

2. The communication system as reciated in claim 1 and further including means for transmitting a television picture over one of said carrier signals, said television picture transmitting means including means located at a transmitting site for detecting a selected standard T-V broadcast signal and extracting synchronization signals therefrom, camera means actuated by the extracted synchronization for generating a video signal representative of an object to be transmitted, means for shifting the frequency of the extracted synchronization signals by a preselected increment, means for sampling the video signal at a rate proportional to the frequency shifted extracted synchronization signals, means for modulating said one carrier with said sampled video signal for transmission over a low frequency circuit to a receiving site, means for detecting the transmitted sampled video signal at the receiving site and producing a received video signal commensurate therewith and at times in synchronization with the frequency shifted signal, T-V receiving means located at the receiving site tuned to said selected T-V broadcast signal for displaying under control by the selected T-V broadcast synchronization signals the received sampled video signal.

3. The system as described by claim 2 wherein the modulating means includes means for amplitude-modulating said carriers.

4. The communications system as described in claim 2, wherein the receiving means further includes a television display tube having a long persistence characteristic commensurate with that necessary to display video signals transmitted over said low frequency circuit, means for switching the video display by the receiver means from the selected broadcast television signal to the sampled video signal received over the low frequency circuit.

5. The communication system as recited in claim 1 wherein the regenerative converting means includes a first tuned circuit coupled to the multiplexed signal and tuned to the frequency of the unmodulated carrier signal, a plurality of mixers, amplifiers and frequency-selective circuits coupled in regenerative manner with the mixers and amplifiers, with the frequency selections tuned to individual frequencies of suppressed carriers and with the mixers coupled to the unmodulated carrier signal to reproduce said suppressed carriers as an output of a mixer, and means responsive to the reproduced suppressed carrier at the output of the mixer and the multiplexed signal for detecting the modulation of a single sideband signal associated with the latter reproduced carrier.

6. A television communication system operable over a low frequency circuit in conjunction with the standard TV broadcast signals, comprising means located at a transmitting site for detecting a selected standard TV broadcast signal and extracting synchronization signals therefrom, camera means actuated by the extracted synchronization for generating a video signal representative of an object to be transmitted, means for shifting the frequency of the extracted synchronization signals by a preselected increment, means for sampling the video signal at a rate proportional to the frequency shifted extracted synchronization signals, means for transmitting the sampled video signal over a low frequency circuit to a receiving site, means for detecting the transmitted sampled video signal at the receiving site and producing a received video signal commensurate therewith and at times in synchronization with the frequency shifted signal, and TV receiving means located at the receiving site tuned to said selected TV broadcast signal for displaying, under control by the selected TV broadcast synchronization signals, the received sampled video signal.

7. The communication system as recited in claim 6 wherein the frequency shifting means includes a two-phase resolver having an input and an output winding, rotatably mounted with respect to each other with the rotation at the preselected incremental frequency, with the input winding coupled to the extracted synchronization signal and the output winding coupled to the sampling means.

8. The communication system as recited in claim 6 wherein the transmitting means includes a frequency multiplier responsive to the frequency shifted extracted synchronization signal for multiplying the frequency thereof, a phase modulator coupled to the multiplied frequency signal to modulate the phase thereof in correspondence with the sampled video signal and produce said transmitted sampled video signal.

9. The communication system as recited in claim 8 wherein the means for detecting the transmitted sampled video signal further includes means for reproducing the frequency shifted extracted synchronization signal, means responsive to the reproduced frequency shifted extracted synchronization signal for producing a pulse at selected intervals thereof, and means actuated by said pulse for phase demodulating said transmitted sampled video signal.

10. The communication system as recited in claim 6 wherein said receiving means further includes a television display tube having a long persistence characteristic commensurate with that necessary to display video signals transmitted over said low frequency circuit.

11. A method of operating a low frequency TV communication system comprising the steps of operating a camera at a transmitting site and a receiver at a receiving site with synchronization signals from a common TV broadcast signal, shifting the frequency of the synchronization signals by a preselected increment, sampling the video signal produced by the camera at the frequency of the frequency-shifted synchronization signals, transmitting the sampled video signal to the receiving site over a low frequency circuit, and applying the sampled video signal to the receiver at times in asynchronous relationship with the common synchronization signals to display video signals from the camera.

References Cited

UNITED STATES PATENTS

| | | | |
|---|---|---|---|
| 2,625,604 | 1/1953 | Edson. | |
| 2,775,647 | 12/1956 | Ensink. | |
| 3,046,329 | 7/1962 | Reesor | 178—5.6 |

OTHER REFERENCES

QST Magazine; September 1960, pp. 13–15, Scientific Library.

RALPH D. BLAKESLEE, Primary Examiner

U.S. Cl. X.R.

178—5.6